United States Patent [19]

Metz et al.

[11] Patent Number: 4,712,747
[45] Date of Patent: Dec. 15, 1987

[54] HOMING DEVICE FOR GUIDED MISSILES USING SIDE NOZZLES

[75] Inventors: Pierre Metz, Palaiseau; Marc Antonicelli, Meung 1 Loire, both of France

[73] Assignee: Thomson Brandt Armements, Boulogne Billancourt, France

[21] Appl. No.: 917,102

[22] Filed: Oct. 8, 1986

[30] Foreign Application Priority Data

Oct. 8, 1985 [FR] France ................. 85 14882

[51] Int. Cl.[4] ......................................... F42B 15/033
[52] U.S. Cl. .................................................. 244/3.22
[58] Field of Search ................. 244/3.22; 60/229; 239/265.19, 265.25, 265.27

[56] References Cited

U.S. PATENT DOCUMENTS

| 4,017,040 | 4/1977 | Dillinger et al. | 244/3.22 |
| 4,078,495 | 3/1978 | Ledden, Jr. | 244/3.22 |
| 4,428,188 | 1/1984 | Turansky et al. | 244/3.22 |
| 4,541,592 | 9/1985 | Moll | 244/3.22 |

FOREIGN PATENT DOCUMENTS

| 0078893 | 8/1982 | European Pat. Off. | |
| 68972 | 1/1983 | European Pat. Off. | 244/3.22 |
| 2390705 | 1/1978 | France | |
| 2538098 | 7/1982 | France | |
| 2071285 | 3/1981 | United Kingdom | |

Primary Examiner—Charles T. Jordan
Attorney, Agent, or Firm—Cushman, Darby & Cushman

[57] ABSTRACT

In this homing device, the side nozzles of the gas propulsion unit can be opened independently of one another. The device comprises a gas generator, preferably using solid propellant, and means to control the shutting and opening of nozzles, these means comprising, for each nozzle, an electromagnetic device controlled independently of the electromagnetic devices of the other nozzles. Provision can be made for a spring giving the power needed to close a nozzle, the electromagnetic device being actuated only to open the nozzle. Among the control means, the invention also provides for a control piston actuated by the electromagnetic device which brings a pressure chamber, within which there is a sliding piston, into contact either with the open air or with the gases coming from the gas generator. The control means are also arranged in such a way as to act as safety valves, in order to avoid the untimely explosion of the gas generator in the event that none of the nozzles is open.

11 Claims, 5 Drawing Figures

HOMING DEVICE FOR GUIDED MISSILES USING SIDE NOZZLES

BACKGROUND OF THE INVENTION

Field of the Invention

The present invention pertains to guided missiles and concerns a gas propulsion unit using a solid propellant and comprising several side nozzles, the relative flow-rates of which can be controlled in order to modify the missile's flight trajectory.

The maneuvering capacity of offensive targets is being constantly improved, thus increasing interception error and error in computing flight distances for missiles. When firing a missile, consideration must be given to the cruising stage when it is desirable to maintain the speed at which the missile moves, and the final stage when the measured trajectory error should be cancelled or at least reduced to a value compatible with the range of effectiveness of the military payload, which may be nil in the case of a hollow-shaped charge.

Description of the Prior Art

Several types of guided missiles, therefore, have homing means to deflect the trajectory of the missile. These means comprise a gas propulsion unit using solid propellant to feed several nozzles. It is, therefore, possible in the prior art to deflect a flight trajectory by controlling the relative flow-rates of the gas jets given by a set of nozzles carefully arranged on the periphery of the missile's body. It is also possible, in the prior art, to tilt the nozzles towards the rear of the missile in order to create a longitudinal thrust in conjunction with a lateral thrust.

A difficulty inherent in the use of solid propellants results from the fact that, once combustion has completely begun, the combustion pressure must be contained within relatively narrow limits. A drop in combustion pressure, resulting from an excessive gas flow-rate, leads to the extinguishing of the propulsion unit. Conversely, an increase in combustion pressure resulting from a reduction in gas flow-rates, causes the untimely explosion of the propulsion unit.

Guidance propulsion units using solid propellants may be divided into several distinct classes, depending on the operating mode of the means used to regulate the relative flow-rate of the gas streams from the nozzles. In one class, as described in the U.S. Pat. No. 4,017,040, each pair of diametrically opposite nozzles is fitted with a valve that has three stable positions: an initial position, a second one for which the gas flows are respectively directed into the first and second nozzles, and a third position in which the gas flow-rate is distributed equally between the two nozzles. In another class, illustrated by the device described in the French patent application No. 2 538 098, each pair of nozzles is fitted with a valve that has two stable positions and operates according to an alternating "all or nothing" cycle. By varying the cyclical opening ratio of the valve, the gas flow may be distributed as desired between either of the two diametrically opposite nozzles.

In these propulsion devices, given the design of the means used to open and shut the valve opening, and for a number of nozzles equal to four or more, it is not possible to obtain all the theoretically possible combinations for opening or shutting the nozzles. A device of this kind is described in the French patent application published under No. 2 508 414. This device comprises a power source providing a gas flow to a set of fixed nozzles set in an annular element within which movable jackets are arranged coaxially. Each of these jackets is provided with a set of apertures for the gases to pass through. The apertures are arranged in such a way, that, through the mobility of the jackets with respect to one another and with respect to the annular element, any one of the nozzles may be supplied. Means are, therefore, provided to position the apertures so that they face the inlet holes of the nozzles.

Several disadvantages have been noted in this respect. There is no system capable of keeping all the nozzles shut. The imperviousness of the mobile elements to one another has to be provided by gaskets and is therefore not perfect. High pressure results in rapid clogging. Furthermore, installation is cumbersome and, therefore, expensive.

BRIEF DESCRIPTION OF THE INVENTION

The purpose of the invention is to provide a homing device, every nozzle of which can be controlled independently of the others and the design of which is simpler.

The main object of the invention is a homing device for guided missiles through the actuation of side nozzles as defined in the claim 1.

BRIEF SUMMARY OF THE DRAWINGS

The invention and its specific features will be better understood from the following decription which is illustrated by the following figures wherein.

DESCRIPTION OF THE PREFERRED EMBODIMENT

Figure 1:
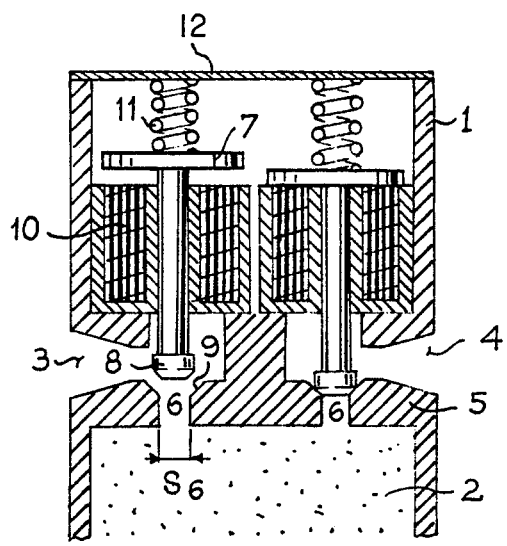
FIG. 1 is an initial explanatory diagram of an initial operation of the propulsion unit according to the invention.

The first operating principle depicted in FIG. 1 is the simplest one. In this Figure, the body 1 of the propulsion unit is partially represented. The non-depicted part encloses the propergol 2. This part ends in a partition 5 with a number N of holes 6 equal to the number N of nozzles, two of which are depicted in the Figure and are diametrically opposite to each other (they bear reference numbers 3 and 4). Each of the holes is connected to a nozzle and is opened or shut by a shutter piston 7. This shutter piston ends in a widened portion 8 which comes to rest, when the nozzle is shut, on a seat 9 made on the edge of the hole 6. These pistons are each actuated by a controlling means which is an electromagnetic device 10. This electromagnetic device is actuated independently of the others. When put into operation, it makes the shutter piston 7 travel in such a way that the corresponding hole is opened. When it is not in operation, the shutter piston is brought to the position where the hole is shut by means of a spring mechanism symbolized in the Figure by a spring 11 resting on a base 12 fastened to the body 1. When the electromagnetic device 10 makes the shutter piston travel and opens the hole 6, the spring is compressed. When the electromagnetic device relaxes its force, the spring brings the piston back against the seat 9 and shuts the hole 6.

As specified earlier, the combustion of the propergol 2 cannot be stopped once it has begun. It follows that, for various reasons, the pressure inside the propellant tank can rise in an untimely way until the missile carrying the propulsion unit is threatened with explosion. The safety system planned in the invention is provided by the control means described earlier and, especially, by the spring mechanism 11. For the diameter of the hole 6 is determined as is its area $S_6$. We also know the maximum pressure $P_{MAX}$ tolerated during normal operation of the propulsion unit, beyond which it is estimated that there is a danger of explosion. We therefore know the force $F_{MAX}$ equal to $P_{MAX}/S$ and the force at which the spring 11 will no longer fulfil its function. If, during operation, the pressure inside the propellant tank increases and exceeds the maximum pressure $P_{MAX}$, then the spring no longer keeps the shutter piston against the hole and the excess pressure disappears through the opening of at least one of the pistons. The spring shuts the nozzle, acts as a safety valve and, thereby, fulfils a self-regulating function as regards the gas pressure.

Figure 2:
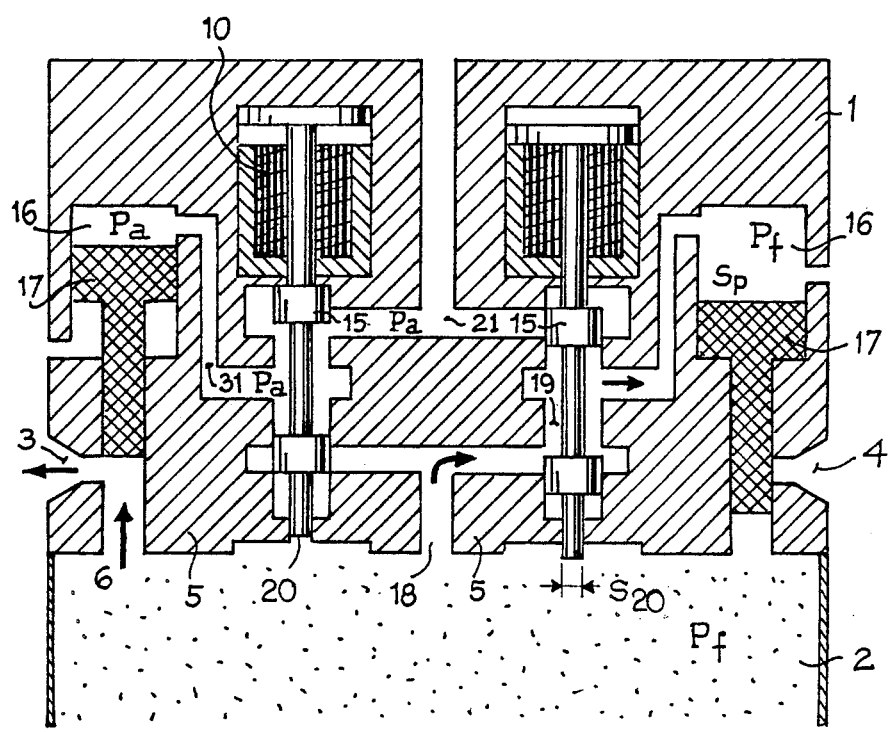
FIG. 2 is another explanatory diagram of a second operation of the propulsion unit according to the invention.

A second form of operation is envisaged with reference to FIG. 2: an additional stage in the operation has been added, i.e. the electromagnetic device no longer acts directly on the shutter piston 7 but on a device which shuts or opens the nozzles. This Figure reproduces several elements from the previous Figure, i.e. the body 1, the propergol 2, the nozzles 3 and 4, the propergol exhaust holes 6 and the electromagnetic devices 10. The function of shutting the holes 6 is no longer performed by a spring mechanism but by a device that uses the pressurized gases which leave the propellant tank.

The electromagnetic devices actuate the control pistons 15 which, in the shut position of the nozzles, use a conduit 31 to bring the pressurized gases into communication with the control chamber 16 acting upon a shutter piston 17. A hole 18 is made in the partition 5 and is connected to the various chambers 19 which house the control pistons 15. These chambers are also connected with the pressure chambers 16 so that the control piston 15 permits or inhibits the movement of pressurized gas towards the pressure chambers. The detail of the shape of the control piston and the chambers 19 is described further below with respect to FIG. 5.

On the left-hand side of the propulsion unit, the nozzle 3 is open. The control piston 15 does not allow pressurized gases to flow through to the pressure chmber 16. This position is maintained by the fact that the end of the control piston 15 is in contact with the propellant in combustion through the hole 20. The gases, which were previously pressurized in the chamber 16 during the previous shutting of the nozzle 3, can escape outside the propulsion unit since the control piston, in this position, allows these gases free passage through a conduit 21 connected to the exterior. The pressure chamber 16 is, therefore, at atmospheric pressure $P_a$. When the electromagnetic device 10 is put into operation, the nozzle is shut: this is the case of the right-hand part of the FIG. 2. The electromagnetic force is greater than the force determined by the ratio $F/S_{20}$ of the operating pressure of the gases on the section of the hole 20. The control piston 15 is, therefore, moved sufficiently to open the way to the gases in combustion coming from the hole 18, and to block the free passage of gases between the combustion chamber 16 and the airing conduit 21. The cross-section of the shutter piston 17 in the pressure chamber 16 is greater than the cross-section of the same piston when it blocks or opens the hole 16 from which the combustion gases escape. The ratio of the two shutter piston 17 cross-sections means that, in these cases, the piston blocks the nozzle 4 until it is stopped inside the pressure chamber 16.

If the pressure inside the propergol tank 2 increases excessively, since the control piston 15 has an end that terminates in this chamber and since it has a cross-section $S_{20}$, it will be subjected to an ever-increasing force which will tend to oppose the effect of the electromagnetic device 10. This device is provided to make the control piston travel with a pre-determined force $F_p$ which depends on the limit pressure which has been taken to be acceptable in the tank. Since $S_{20}$ is the cross-section of the control piston 15 which ends in the propellant tank, this force is related to the pressure of the gases by the following formula: $F_{MAX} = P_{MAX} \times S_{20}$. As soon as the pressure inside the propergol tank 2 exceeds this value $P_{MAX}$, the control piston will return to the position which it occupied earlier and which corresponds to the opening of the nozzle. Since this nozzle is opened, the pressure inside the tank will fall again and the explosion of the propulsion unit will be avoided.

Figure 3:
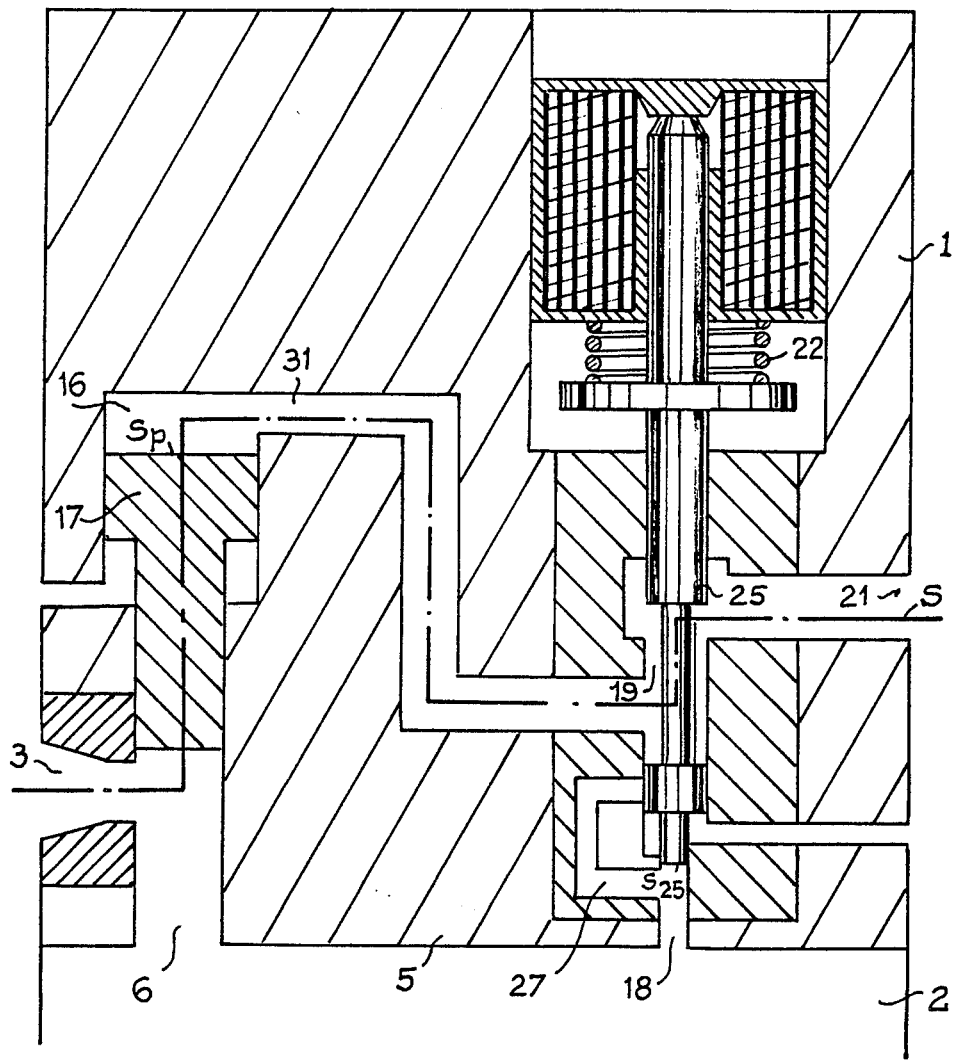
FIGS. 3 and 4 are cross-section figures of an embodiment of the propulsion unit according to the invention.

FIG. 3 represents an embodiment of the invention which partially uses each of the two principles described earlier. This Figure reproduces many elements that belong to the diagram of FIG. 2: the body 1, the propergol 2 in a tank, the nozzle 3, the electromagnetic device 10, the piston control 25 which is slightly modified, the pressure chamber 16 with a cross-section $S_p$, the shutting piston 17, the hole 18 by which the control piston can come into contact with the combustion chamber of the propergol tank, the chamber 19 of the control piston, the hole 6 by which gases can be supplied to the nozzle, the conduit 31 and the hole 21 enabling gases to escape outside. The principle by which the opening and shutting of the nozzle 3 are controlled is very similar to the one depicted in FIG. 2. The difference lies in the use of a spring 22 which rests on the electromagnetic device 10. It is also possible to envisage setting the spring so that it rests on the bottom as in the initially described mode of operation. The spring maintains the control piston in a position so that the nozzle is shut. The electromagnetic device 10 displaces the control piston in reverse and the electric current is used only to open the nozzle 3. When the electromagnetic device is powered, the control piston 25 is in the position shown in FIG. 3, with the spring 22 compressed. In this position the shutting piston is withdrawn, the nozzle is operational and the gases which are already in the pressure chamber 16 are discharged through the hole 21, the configuration of the control piston 25 and its chamber 19 being such that the way remains clear for these gases coming from the pressure chamber. In this position, the control piston prevents gases from the propellant tank from penetrating into the interior of the control device. For, with its end, the control piston blocks the entire chamber in which it is housed.

To shut the nozzle 3, the supply to the electromagnetic device 10 is cut off. The force given by the spring 22 to the control piston 25 is greater than the force determined by the operating pressure of the gases acting on the end of the control piston. This piston is therefore pushed back towards the propellant tank in a position such that it blocks the exhaust hole 21 leading outside, and such that, by means of a conduit 27 which by-passes the end of the control piston, the gases in combustion can penetrate the interior of the chamber 19 of the control piston and move towards the pressure chamber 16, thus pushing back the shutting piston 17 which entirely blocks the nozzle.

Similarly here, when the pressure rises abnormally in the propellant tank, the spring 22 is designed to yield if this pressure exceeds the pre-determined pressure $P_{MAX}$. The force applied by the spring to the control piston is determined by the following formula:
$F_R = P_{MAX} \times S_{25}$
where $S_{25}$ is the area of the control piston 25 which is in contact with the tank of propergol 2. In this case, the nozzle is opened again and the pressure inside the propergol tank falls again.

Figure 4:
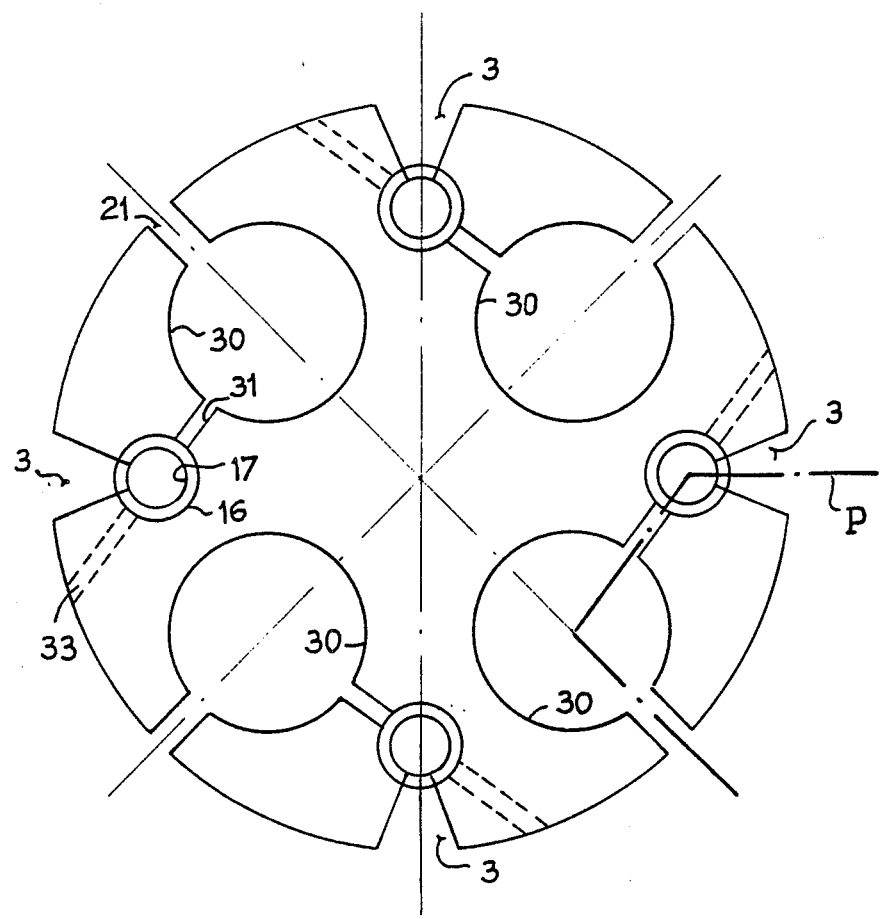

FIG. 4 represents a possible arrangement of the invention in the case of 4 nozzles. To understand this arrangement with respect to the embodiment described in FIG. 3, a cross-section line P has been shown by a heavy line. This line represents the cross-section along which FIG. 3 is drawn in the case of the arrangement described in FIG. 4. The four nozzles and their control system are distributed symmetrically in the propulsion unit and each occupies a sector of a circle in the body 1. The four chambers 30 represent the places in which the control devices are housed. The chambers are connected with the outside environment, always through the hole 21. The pressure chambers 16 and the opening pistons 17 have been depicted superimposed, with the control pistons adjacent to the nozzles 3. If we look simultaneously at FIG. 3, where a dark line S represents the cross-section planes of FIG. 4, an initial conduit 31 links the positions of the control devices 30 to the pressure chambers 16. FIG. 4 shows that the nozzles and their control devices are close to one another and housed in four equal sectors of a circle. This arrangement represents one possible mode of embodiment but other arrangements, in particular for eight nozzles, may be envisaged. The axis, reference P, represented by a darkline, is the axis along which FIG. 3 is sectioned.

To make the internal conduits such as those marked 31 in FIG. 4, a drilled hole 33 may be made in the alignment of the conduit 31, and then the inoperative part (shown in this Figure by dashes) may be plugged up again.

The body 1 is made of a light composite material which is mechanically and thermally resistant and has a good coefficient of friction. This is necessary because of major differences in pressure and temperature, especially on either side of the pistons which are very precisely fitted into the body. This material is known by specialists as "carbon-carbon" material. In fact, it consists of carbon fibres coated with a powdered carbon base product in the case of wire. For more complex elements, which are not wire-shaped, as with the body 1, the structure is a more complex one.

The spring has been depicted in a symbolic manner as a helical spring. It must be noted that a leaf spring or leaf-structured spring may be advantageously used. For an embodiment using four nozzles, we have considered using a cross-shaped leaf spring fastened to the center of the body by its middle, with each end of its arms applying its fore against a shutting piston or a control piston.

Figure 5:
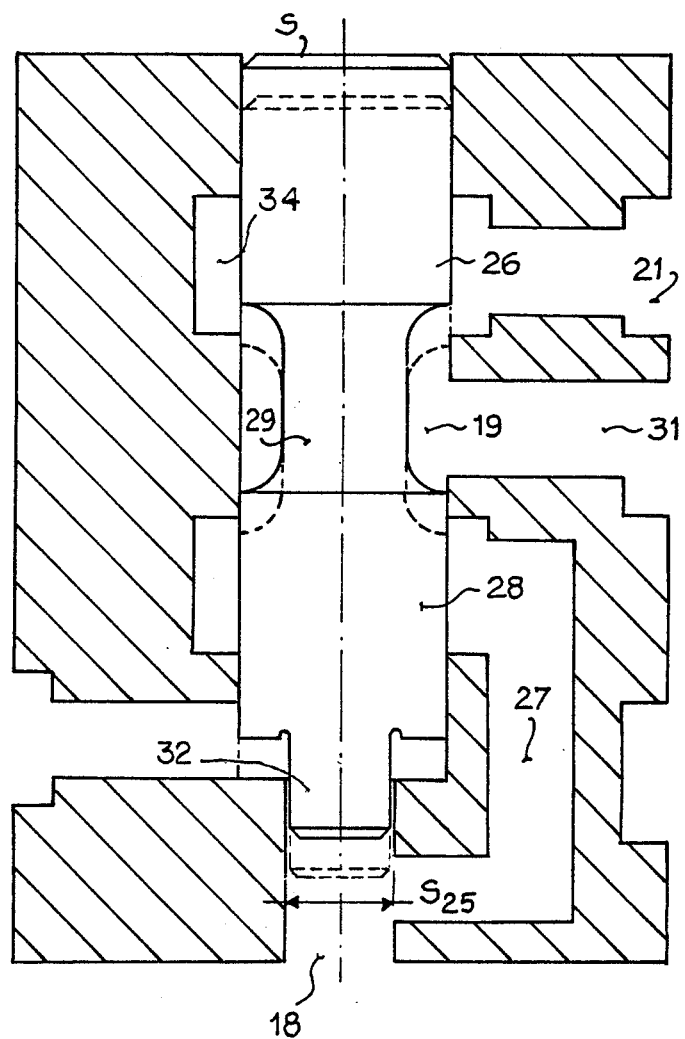
FIG. 5 is a cross-section of an embodiment of the feeder piston in the propulsion unit according to the invention.

FIG. 5 depicts the control piston 25 and its chamber 19 in detail. This Figure corresponds to the embodiment depicted in FIG. 3. The position of the control piston is the same in this Figure, i.e. in a position that controls the opening of the nozzle. The piston has four parts, an initial and a second part (26 and 28 respectively) with cross-sections S, these sections corresponding to the minimum section of the chamber 19. A narrowing 29 of the piston brings these parts 26 and 28 together. The end 32 of the piston has a cross-section $S_{25}$ which is smaller than the others. This end is always in contact with the gases coming from the propellant tank. Facing the gas-discharging hole 21, the chamber 19 has a broader cross-section symbolized by a chamber 34. Facing the hole 31 which allows the gas to reach the pressure chamber, the chamber has a cross-section equal to the maximum cross-section S of the piston. In the position of the piston represented by a dark line, the discharging hole 21 and the initial conduit 31 communicate with each other so as to enable the removal of the gases previously used to shut the nozzle. As shown in FIG. 3, the combustion gases from the propellant tank 2 cannot reach the pressure chamber because the second wide-sectioned part 28 completely blocks the second conduit 27 which by-passes the end of the piston.

The position of the control piston corresponding to the shutting of the nozzle is depicted by dashes only as far as the functional parts of the piston are concerned. This piston is moved towards the bottom of the Figure and the initial wide-sectioned part 26 of the piston isolates the hole 21 and the chamber 34 and thus prevents the gases from escaping outside the propulsion unit. By contrast, the second wide-sectioned part of the initial piston has descended sufficiently to bring the second conduit 31 into communication with the gas-inlet conduit 27. The gases in combustion can thus reach the pressure chamber and act upon the shutting piston of the nozzle. The operating principle depicted in FIG. 1 and the embodiment depicted in FIG. 3 both use a spring either to maintain the piston by itself in a nozzle-shutting position or to actuate the shutting of the nozzle by the piston 17 so that little power is used. For the nozzles are most often shut, and in the cases depicted in FIGS. 1 and 3, it is the piston that provides the power needed to maintain this shut condition. In FIG. 3, it is the electromagnetic device which ensures that the nozzle is in a shut condition, a fact that calls for the constant consumption of electric power. In FIGS. 1 and 3, the electric power needed to actuate the electromagnetic device is used simply to open the nozzle if needed.

The above embodiments have been described as examples, but other arrangements can be contemplated in the body 1. It might prove to be worthwhile to reduce this body to the minimum or even to eliminate it altogether.

What is claimed is

1. Homing device using a propulsion unit with side nozzles for guided missiles, comprising:
    a number N of side nozzles;
    a gas generator designed to feed the said nozzles;
    means to control the blocking and opening of the nozzles so as to affect the trajectory of the missile, comprising, for each nozzle, an electromagnetic device, controlled independently of the electromagnetic devices of the other nozzles so as to block or open the nozzles independently of one another.

2. Homing device according to claim 1 wherein the controlling means are arranged to perform the function of a safety valve in order to avoid the explosion of the gas generator in the event that none of the nozzles is open at a given moment.

3. Homing device according to claim 1 wherein each electromagnetic device actuates the travel of a control piston, one end of which terminates in the combustion chamber of the gas generator thus controlling the opening and shutting of the corresponding nozzle.

4. Homing device according to claim 3 wherein each electromagnetic device, when it is powered, makes its corresponding nozzle open through the control piston, and wherein a spring acting on the said control piston ensures the position of the control piston, when the electromagnetic device is not powered, so as to shut the corresponding nozzle.

5. Homing device according to claim 3 wherein, when the electromagnetic device is powered, the control piston actuates the shutting of the nozzle while providing unhampered passage for the combustion gases from the gas generator to a pressure chamber within which slides a piston which itself shuts and opens the nozzle to the outside, doing so through the position and shape of the said control piston with respect to the chamber in which it slides, the nozzle being opened, when the electromagnetic device is no longer powered, by a new position of the control piston which connects the pressure chamber with the outside air.

6. Homing device according to claim 4, wherein the nozzle is shut through the fact that, under the pressure of the spring, the control piston is then in a position which connects the gas generator with a pressure chamber within which there is a sliding piston which itself shuts the nozzle which is opened by the fact that the control piston, actuated by the electromagnetic device, then connects the pressure chamber with the outside air.

7. Homing device according to claim 4 wherein the spring shuts the nozzle to a stiffness such that it yields to the pressure of the gases from the gas generator starting from a determined pressure, and does so through the area of the end of the control piston.

8. Homing device according to claim 4 wherein the control piston has two wide parts surrounding a narrow part which, when the control piston moves inside the chamber, connects the pressure chamber, through an initial conduit, either with the outside air by means of a hole so as to open the nozzle or with the gases from the gas generator through a second conduit so as to shut the nozzle.

9. Homing device according to claim 8 wherein the cross-section of the end of the control piston in contact with the gases from the gas generator and the stiffness of the spring have predetermined values so that the said spring yields under the pressure of gases above a predetermined pressure value.

10. Homing device according to claim 1 wherein each unit comprising one nozzle and all the apparatus needed to control it is set in a body so as to occupy a determined sector of a circle.

11. Homing device according to claim 1 comprising a body within which is housed the device, wherein the said body is made of a carbon-based composite material known as a carbon-carbon material.

* * * * *